US008495131B2

(12) United States Patent
Ahuja et al.

(10) Patent No.: US 8,495,131 B2
(45) Date of Patent: Jul. 23, 2013

(54) METHOD, SYSTEM, AND PROGRAM FOR MANAGING LOCKS ENABLING ACCESS TO A SHARED RESOURCE

(75) Inventors: Chetan Ahuja, Pittsburgh, PA (US); Frank Stewart Filz, Beaverton, OR (US); John Davis Palmer, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 2720 days.

(21) Appl. No.: 10/266,458

(22) Filed: Oct. 8, 2002

(65) Prior Publication Data

US 2004/0068563 A1 Apr. 8, 2004

(51) Int. Cl.
*G06F 15/16* (2006.01)

(52) U.S. Cl.
USPC ........... 709/203; 709/225; 709/219; 709/223; 707/9; 707/10; 713/157; 713/201

(58) Field of Classification Search
USPC .. 709/225, 203, 226, 249, 219, 223; 713/201, 713/157; 707/9, 10
See application file for complete search history.

(56) References Cited

U.S. PATENT DOCUMENTS

| | | |
|---|---|---|
| 5,060,144 A | 10/1991 | Sipple et al. |
| 5,161,227 A | 11/1992 | Dias et al. |
| 5,175,852 A | 12/1992 | Johnson et al. |
| 5,202,971 A | 4/1993 | Henson et al. |
| 5,226,159 A | 7/1993 | Henson et al. |
| 5,251,317 A | 10/1993 | Iizuka et al. |
| 5,339,427 A | 8/1994 | Elko et al. |
| 5,392,433 A | 2/1995 | Hammersley et al. |
| 5,440,743 A | 8/1995 | Yokota et al. |
| 5,454,108 A | 9/1995 | Devarakonda et al. |
| 5,459,871 A | 10/1995 | Van Den Berg |
| 5,513,314 A | 4/1996 | Kandasamy et al. |
| 5,535,375 A | 7/1996 | Eshel et al. |
| 5,537,645 A | 7/1996 | Henson et al. |
| 5,613,139 A | 3/1997 | Brady |
| 5,615,373 A | 3/1997 | Ho |
| 5,682,537 A | 10/1997 | Davies et al. |

(Continued)

FOREIGN PATENT DOCUMENTS

| | | |
|---|---|---|
| EP | 0 428 006 | 5/1991 |
| EP | 0 575 067 | 12/1993 |

(Continued)

OTHER PUBLICATIONS

Richard Rabbat, A high-availability clustering architecture with data integrity guarantees, 2001.*

(Continued)

*Primary Examiner* — Thuong Nguyen
(74) *Attorney, Agent, or Firm* — David W. Victor; Konrad, Raynes, Davda & Victor LLP (57) ABSTRACT

Provided are a method, system, and program for managing locks enabling access to a shared resource. A first server receives a lock request from a client for the shared resource. A determination is made as to whether a second server owns the client locks. The first server issues a request to the second server to transfer ownership of the client locks to the first server, wherein the client lock requests are handled by the server owning the client locks.

35 Claims, 5 Drawing Sheets

U.S. PATENT DOCUMENTS

| | | | |
|---|---|---|---|
| 5,692,120 A | 11/1997 | Forman et al. | |
| 5,734,909 A * | 3/1998 | Bennett | 710/200 |
| 5,742,813 A | 4/1998 | Kavanagh et al. | |
| 5,745,747 A | 4/1998 | Chang et al. | |
| 5,761,659 A | 6/1998 | Bertoni | |
| 5,845,117 A | 12/1998 | Fujita | |
| 5,845,147 A | 12/1998 | Vishlitzky et al. | |
| 5,872,981 A | 2/1999 | Waddington et al. | |
| 5,890,153 A | 3/1999 | Fukuda et al. | |
| 5,933,825 A | 8/1999 | McClaughry et al. | |
| 5,983,225 A | 11/1999 | Anfindsen | |
| 5,987,621 A | 11/1999 | Duso et al. | |
| 6,029,190 A | 2/2000 | Oliver | |
| 6,041,384 A | 3/2000 | Waddington et al. | |
| 6,044,404 A | 3/2000 | Holdsworth et al. | |
| 6,105,098 A | 8/2000 | Ninose et al. | |
| 6,115,715 A | 9/2000 | Traversat et al. | |
| 6,128,657 A * | 10/2000 | Okanoya et al. | 709/224 |
| 6,141,720 A | 10/2000 | Jeffords et al. | |
| 6,145,089 A | 11/2000 | Le et al. | |
| 6,145,094 A * | 11/2000 | Shirriff et al. | 714/11 |
| 6,151,659 A | 11/2000 | Solomon et al. | |
| 6,173,293 B1 | 1/2001 | Thekkath et al. | |
| 6,182,186 B1 | 1/2001 | Daynes | |
| 6,192,408 B1 * | 2/2001 | Vahalia et al. | 709/229 |
| 6,266,785 B1 | 7/2001 | McDowell | |
| 6,275,953 B1 | 8/2001 | Vahalia et al. | |
| 6,292,860 B1 | 9/2001 | Cochcroft, Jr. et al. | |
| 6,324,571 B1 * | 11/2001 | Hacherl | 709/208 |
| 6,324,581 B1 | 11/2001 | Xu et al. | |
| 6,336,171 B1 * | 1/2002 | Coskrey, IV | 711/152 |
| 6,341,318 B1 | 1/2002 | Dakhil | |
| 6,389,420 B1 | 5/2002 | Vahalia et al. | |
| 6,412,034 B1 | 6/2002 | Chan | |
| 6,539,446 B1 | 3/2003 | Chan | |
| 6,553,384 B1 | 4/2003 | Frey et al. | |
| 6,618,744 B1 | 9/2003 | Simmons et al. | |
| 6,668,304 B1 | 12/2003 | Satran et al. | |
| 6,697,901 B1 | 2/2004 | Shun Chan | |
| 6,757,769 B1 | 6/2004 | Ofer | |
| 6,789,204 B2 * | 9/2004 | Abdelnur et al. | 726/1 |
| 6,823,511 B1 | 11/2004 | McKenney et al. | |
| 6,959,337 B2 | 10/2005 | McLaughlin et al. | |
| 7,010,554 B2 | 3/2006 | Jiang et al. | |
| 7,047,337 B2 | 5/2006 | Armstrong et al. | |
| 7,089,555 B2 | 8/2006 | Calvignac et al. | |
| 7,107,319 B2 | 9/2006 | Chandrasekaran et al. | |
| 7,174,552 B2 | 2/2007 | Mikael et al. | |
| 7,328,263 B1 | 2/2008 | Sadjadi | |
| 7,844,585 B2 | 11/2010 | Walker | |
| 7,870,111 B2 | 1/2011 | Walker | |
| 8,161,018 B2 | 4/2012 | Walker | |
| 8,200,643 B2 | 6/2012 | Walker | |
| 2003/0018782 A1 | 1/2003 | Dixon et al. | |
| 2003/0066880 A1 | 4/2003 | Ieshima et al. | |
| 2003/0135537 A1 | 7/2003 | Mikael et al. | |
| 2003/0191745 A1 | 10/2003 | Jiang et al. | |
| 2003/0217092 A1 | 11/2003 | Veselov | |
| 2003/0233455 A1 * | 12/2003 | Leber et al. | 709/226 |
| 2004/0019892 A1 * | 1/2004 | E. et al. | 718/107 |
| 2004/0068563 A1 | 4/2004 | Ahuja et al. | |
| 2004/0117372 A1 | 6/2004 | Kasman | |
| 2004/0199734 A1 | 10/2004 | Rajamani et al. | |
| 2004/0221079 A1 | 11/2004 | Goldick | |
| 2006/0101081 A1 | 5/2006 | Lin et al. | |
| 2006/0167921 A1 | 7/2006 | Grebus et al. | |
| 2006/0206901 A1 | 9/2006 | Chan | |
| 2006/0212496 A1 | 9/2006 | Romine et al. | |
| 2008/0263549 A1 | 10/2008 | Walker | |
| 2011/0078126 A1 | 3/2011 | Walker | |
| 2012/0173499 A1 | 7/2012 | Walker | |

FOREIGN PATENT DOCUMENTS

| | | |
|---|---|---|
| JP | 08137707 | 5/1996 |
| JP | 10-021098 | 1/1998 |
| JP | 7253950 | 10/1998 |
| TW | 513512 | 12/2002 |
| TW | 522303 | 3/2003 |
| WO | WO-99/38096 | 7/1999 |

OTHER PUBLICATIONS

Ciciani, B., D. M. Dias, B. R. Tyer, and P.S. Yu. "Protocol for Hybrid Centralized-Distributed Database System," *IBM Technical Disclosure Bulletin*, vol. 31, No. 9, Feb. 1989, pp. 474-475.

Distributed Management Task Force, Inc. (DMTF). "Specification for CIM Operations over HTTP", (online), DSP0200, Status: Preliminary, Version 1.1, May 2, 2002, [retrieved on Jun. 27, 2002]. Retrieved from the Internet at <URL: http://www.dmtf.org/standards/documents/WBEM/DSP0200.html>.

Ray, Indrajit, Elisa Bertino, Sushil Jajodia, and Luigi Mancini, "An Advanded Commit Protocol for MLS Distributed Database Systems", © 1996 ACM, pp. 119-128.

U.S. Appl. No. 10/428,758, filed May 1, 2003, entitled "Method, System, and Program for Managing Locks and Transactions", invented by M.L. Walker.

U.S. Appl. No. 10/428,780, filed May 1, 2003, entitled "Method, System, and Program for Lock and Transaction Management", invented by M.L. Walker.

IBM Corp., "z/OS V1R2.0 Network File System User's Guide," Doc. No. SC26-7419-02, Chapter 1 & 5,Third Edition, Dec. 2001, pp. 1-38 [online].

The Santa Cruz Operation, Inc., "The NFS Network Lock Manager. 'The Locking Protocol,'" p. 1, [online] [retrieved on Aug. 2, 2002]. Retrieved from http://docsrv.caldera.com/NET_nfs/nfsC.lock_prot.html.

The Santa Cruz Operation, Inc., "The NFS Network Lock Manager. File Locking and System Crashes," pp. 1-2, [online] [retrieved on Aug. 2, 2002]. Retrieved from http > //docsrv.caldera.com/NET_nfs/nfsC.locking_crashes.html.

The Santa Cruz Operation, Inc., "The NFS Network Lock Manager. The Network Status Monitor," p. 1, [online] [retrieved on Aug. 2, 2002]. Retrieved from http://docsrv.caldera.com/NET_nfs/nfsC.stat_mon.html.

"A Highly Available Lock Manager for HA-NFS," by A. Bhide and S. Shepler. Proceedings of the USENIX Summer Conference1992, pp. 177-184.

"Scaling Internet Services by LinuxDirector," by W. Zhang, S. Jin and Q. Wu. Fourth International Conference/Exhibition on High Performance Computing in the Asia-Pacific Region, 2000. Proceedings. vol. 1, 2000, pp. 176-183.

The HA-NFS Project home page. [online] [retrieved on Jan. 7, 2002]. Retrieved from http://www-2.cs.cmu.edu/afs/cs.cmu.edu/user/mootaz/ftp/html/hanfs.html.

PCT/GB2004/001899, PCT Invitation to Pay Additional Fees, dated Sep. 27, 2004.

Moss, et al., "Nested Transactions: An Approach to Reliable Distributed Computing", Laboratory for Computer Science, Massachusetts Institute of technology, Apr. 1981, pp. 1-178.

Domenici, et al., "A Protocol for Resource Locking and Deadlock Detection in a Multi-User Envrionment", Microprocessing and Microprogramming 27 (Aug. 1989), Nos. 1/5, Amsterdam, NL; pp. 431-437.

De Ferreira Rezende et a., "Transaction Identifiers in Nested Transactions; Implementation Schemes and Performance", The Computer Journal, vol. 40, No. 5, 1997; pp. 245-258.

Rothermel, et al., "ARIES/NT: A Recovery method Based on Write-Ahead Logging for Nested Transactions", Proceedings of the 15th International Conference on Very Large Data Bases, Amrsterdam, 1989; pp. 337-346.

IBM Corp., "Recovery Protocol for Nested Transactions Using Write-Ahead Logging", IBM Technical Disclosure Bulletin, vol. 31, No. 4, Sep. 1988, pp. 451-452.

C. Mohan, ARIES: A Transaction Recovery Method Supporting Fine-Granularity Locking and Partial Rollbacks Using Write-Ahead Logging, ACM Transactions on Database Systems, vol. 17, No. Mar. 1992, pp. 94-162.

Shin et al., "An Efficient Log-Based Crash Recovery Scheme for Nested Transactions", Microprocessing and Micropramming, vol. 31, Issue 1-5, Apr. 1991, pp. 99-104.

PCT/GB/2004/001927 PCT Search Report and Written Opinion, mailed Jan. 31, 2005.

Scott, et al., "Non-Blocking Timeout in Scalable Queue-Based Spin Locks", PODC 2002, Jul. 21-24, 2002, pp. 31-40.

Magnussen, et al., "Queue Locks on Cache Coherent Multiprocessors,"IEEE 1993 doc., ID XP 010098628, pp. 165-171.

Mellor-Crummy, et al., "Algorithms for Scalable Synchronization . . . ", ACM Transactions on Computer Systems, Feb. 9, 1991, No. 1, New York, pp, 21-28.

Radovic, et al., Efficient Synchronization for Nonuniform Communication Architectures, IEEE 2002, Doc. ID XP002308574, pp. 1-13.

Scott, et al., Scalable Queue-Based Spin Locks with Timeout, PPOPP '01, Jun. 18-20, 2001, 9 pp.

IBM Corp., "Fine Granularity Locking to Support High Data Availability in a Client/Server Database Management System", IBM Technical Disclosure Bulletin, Voo. 38, No. 2, Feb. 1995, pp. 143-145.

Rabbat, et al., "A High-Availability Clustering Architecture with Data Integrity Guarantees", Proceedings of the 2001 IEEE International Conference on Cluster Computing, 2002.

U.S. Patent Application entitled "Method, System and Program for Managing Locks and Transactions", U.S. Appl. No. 11/840,842, filed Aug. 17, 2007, by inventor M.L. Walker.

U.S. Patent Application entitled "Method, System and Program for Lock and Transaction Management", U.S. Appl. No. 11/777,911, filed Jul. 13, 2007, by inventor M.L. Walker.

EPO Communication dated Jun. 18, 2007 for Application No. 04 731 051.1-1243.

PCT/GB2004/001899, PCT Search Report and Written Opinion, dated Dec. 29, 2004.

Non-U.S Search Report for for Taiwan Invention Patent Application No. 093112119/SJ0920020055TW1, dated Mar. 17, 2009, 1 pg.

Non-U.S Search Report for for Taiwan Invention Patent Application SJ0920020088TW1, dated Apr. 2, 2009, 1 pg.

Patent Abstract for TW513512, published on Dec. 11, 2002, 1 pg.

Patent Abstract for TW522303, published on Mar. 1, 2003, 1 pg.

Patent Abstract and Machine Translation for PUPA 08-137707, dated May 31, 2006, pp. 1-19.

Machine Translation for PUPA 10-021098, dated Jan. 23, 1998, pp. 1-12.

Canadian Office Action, dated Feb. 3, 2010, for Application No. 2,677,251, 2 pgs.

R. Kataoka et al. "Priority Management for Mixed Processing of Real-Time and On-Line Transactions", Transactions of the Instituted of Electronics, Information and Commission Engineers, vol. 176 D-I, No. 5, May 25, 1993, total 12 pgs. (English Abstract Included).

Japanese Information Disclosure Statement, dated Mar. 26, 2010, 1 pg.

First Office Action dated Dec. 16, 2005, pp. 1-23 for U.S. Appl. No. 10/428,758, filed May 1, 2003 by inventor Michael Leo Walker.

Response to First Office Action dated Mar. 20, 2006, pp. 1-13, for U.S. Appl. No. 10/428,758, filed May 1, 2003 by inventor Michael Leo Walker.

Supplemental Amendment dated Mar. 23, 2006, pp. 1-10, for U.S. Appl. No. 10/428,758, filed May 1, 2003 by inventor Michael Leo Walker.

Final Office Action dated Aug. 2, 2006, pp. 1-24, for U.S. Appl. No. 10/428,758, filed May 1, 2003 by inventor Michael Leo Walker.

Response to Final Office Action dated Jan. 19, 2007, pp. 1-14, for U.S. Appl. No. 10/428,758, filed May 1, 2003 by inventor Michael Leo Walker.

Second Non-Final Office Action dated May 17, 2007, pp. 1-24, for U.S. Appl. No. 10/428,758, filed May 1, 2003 by inventor Michael Leo Walker.

Response to Second Non-Final Office Action dated Aug. 17, 2007, pp. 1-14, for U.S. Appl. No. 10/428,758, filed May 1, 2003 by inventor Michael Leo Walker.

Second Final Office Action dated Nov. 1, 2007, pp. 1-26, for U.S. Appl. No. 10/428,758, filed May 1, 2003 by inventor Michael Leo Walker.

Response to Second Non-Final Office Action dated Feb. 13, 2008, pp. 1-17, for U.S. Appl. No. 10/428,758, filed May 1, 2003 by inventor Michael Leo Walker.

Notice of Allowance dated Mar. 31, 2008, pp. 1-14 for U.S. Appl. No. 10/428,758, filed May 1, 2003 by inventor Michael Leo Walker.

Notice of Allowance dated Apr. 21, 2008, pp. 1-6, for U.S. Appl. No. 10/428,758, filed May 1, 2003 by inventor Michael Leo Walker.

First Office Action dated Apr. 30, 2009, pp. 1-17, for U.S. Appl. No. 11/840,842, filed Aug. 17, 2007 by inventor Michael Leo Walker.

Response to First Office Action dated Jul. 30, 2009, pp. 1-7, for U.S. Appl. No. 11/840,842, filed Aug. 17, 2007 by inventor Michael Leo Walker.

Notice of Allowance dated Nov. 2, 2009, pp. 1-20, for U.S. Appl. No. 11/840,842, filed Aug. 17, 2007 by inventor Michael Leo Walker.

Second Notice of Allowance dated Jun. 28, 2010 pp. 1-13, for U.S. Appl. No. 11/840,842, filed Aug. 17, 2007 by inventor Michael Leo Walker.

First Office Action dated May 26, 2011, pp. 1-40, for U.S. Appl. No. 12/147,388, filed Jun. 26, 2008 by inventor Michael Leo Walker.

Response to First Office Action dated Aug. 26, 2011, pp. 1-11, for U.S. Appl. No. 12/147,388, filed Jun.26, 2008 by inventor Michael Leo Walker.

Notice of Allowance dated Dec. 14, 2011, pp. 1-25, for U.S. Appl. No. 12/147,388, filed Jun. 26, 2008 by inventor Michael Leo Walker.

First Office Action dated Apr. 19, 2006, pp. 1-22, for U.S. Appl. No. 10/428,780, filed May 1, 2003 by inventor Michael Leo Walker et al.

Response to First Office Action dated Jul. 19, 2006, pp. 1-18, for U.S. Appl. No. 10/428,780, filed May 1, 2003 by inventor Michael Leo Walker et al.

Final Office Action dated Oct. 23, 2006, pp. 1-27, for U.S. Appl. No. 10/428,780, filed May 1, 2003 by inventor Michael Leo Walker et al.

Response to Final Office Action dated Dec. 21, 2006. pp. 1-20, for U.S. Appl. No. 10/428,780, filed May 1, 2003 by inventor Michael Leo Walker et al.

Advisory Action dated Jan. 9, 2007, pp. 1-5, for U.S. Appl. No. 10/428,780, filed May 1, 2003 by inventor Michael Leo Walker et al.

Supplemental Amendment dated Jan. 23, 2007, pp. 1-22, for U.S. Appl. No. 10/428,780, filed May 1, 2003 by inventor Michael Leo Walker et al.

Notice of Allowance dated Aug. 21, 2007, pp. 1-9, for U.S. Appl. No. 10/428,780, filed May 1, 2003 by inventor Michael Leo Walker et al.

First Office Action dated Jun. 24, 2009, pp. 1-26, for U.S. Appl. No. 11/777,911, filed Jul. 13, 2007 by inventor Michael Leo Walker et al.

Response to First office Action dated Sep. 24, 2009, pp. 1-19, for U.S. Appl. No. 11/777,911, filed Jul. 13, 2007 by inventor Michael Leo Walker et al.

Final Office Action dated Jan. 6, 2010, pp. 1-13, for U.S. Appl. No. 11/777,911, filed Jul. 13, 2007 by inventor Michael Leo Walker et al.

Response to final Office Action dated Apr. 6, 2010, pp. 1-8, for U.S. Appl. No. 11/777,911, filed Jul. 13, 2007 by inventor Michael Leo Walker et al.

Notice of Allowance dated Apr. 23, 2010, pp. 1-8, for U.S. Appl. No. 11/777,911, filed Jul. 13, 2007 by inventor Michael Leo Walker et al.

Notice of Appeal and Pre-Appeal Request dated Apr. 6, 2010, pp. 1-6, for U.S. Appl. No. 11/777,911, filed Jul. 13, 2007 by inventor Michael Leo Walker et al.

Second Notice of Allowance dated Sep. 9, 2010, pp, 1-9, for U.S. Appl. No. 11/777,911, filed Jul. 13, 2007 by inventor Michael Leo Walker et al.

First Office Action dated Apr. 8, 2011, pp. 1-23, for U.S. Appl. No. 12/961,290, filed Dec. 6, 2012 by inventor Michael Leo Walker et al.

Response to First Office Action dated Jul. 8, 2011, pp. 1-13, for U.S. Appl. No. 12/961,290, filed Dec. 6, 2012 by inventor Michael Leo Walker et al.

Supplemental Amendment dated Aug. 3, 2001, pp. 1-10, for U.S. Appl. No. 12/961,290, filed Dec. 6, 2012 by inventor Michael Leo Walker et al.

Notice of Allowance dated Jan. 18, 2012, pp. 1-22, for U.S. Appl. No. 12/961,290, filed Dec. 6, 2012 by inventor Michael Leo Walker et al.

Second Notice of Allowance dated May 3, 2012, pp. 1-12, for U.S. Appl. No. 12/961,290, filed Dec. 6, 2012 by inventor Michael Leo Walker et al.

Supplemental Notice of Allowance dated Aug. 21, 2007 pp. 1-9, for U.S. Appl. No. 10/428,780, filed May 1, 2003 by inventor Michael Leo Walker et al.

Office Action, dated Dec. 20, 2012, for U.S. Appl. No. 13/418,155, filed Mar. 12, 2012 by Micheal L. Walker et al, pp. 1-40.

Office action dated Dec. 20, 2012, for U.S. Appl. No. 13/418,155, filed Mar. 12, 2012, entitled "Managing Locks and Transactions", invented by Michael Leo Walker, pp. 1-40.

* cited by examiner

Client Status Monitor File

METHOD, SYSTEM, AND PROGRAM FOR MANAGING LOCKS ENABLING ACCESS TO A SHARED RESOURCE

BACKGROUND OF THE INVENTION

1. Field of the Invention

The present invention relates to a method, system, and program for managing locks enabling access to a shared resource.

2. Description of the Related Art

In a network system, a client may access a storage resource including a file system through a server node. The storage resource may comprise one or more hard disk drives, an array of disks (e.g., Just a Bunch of Disks (JBOD), a Redundant Array of Independent Disk RAID), etc.), a tape library or a cache. In the Network File System (NFS), client systems issue requests to an NFS server, which then is capable of accessing data and performing Input/Output (I/O) operations with respect to a shared storage resource. In this way, the NFS server acts as an intermediary to read, write, create or delete files maintained in another system, which may be any computing device in the network. The NFS client mounts the data sets from another system to appear as local directories and files on the client system. The NFS server allows for file sharing between operating system platforms and file serving. An NFS client includes software that enables the client to access data from the NFS server.

An NFS client may lock a record or file on the NFS server. A client may obtain a monitored lock. With a monitored lock, if the host on which the NFS server is operating failed, then the locks are reinstated when the server host recovers. If the client host fails before the locks are released, then the NFS server will discard the locks. Each NFS client and server includes a lock manager program that manages locks and includes the protocol to handle recovery from failure. The lock managers obtain information on the status of locks through a network status monitor (NSM) program that runs on each client and server. Applications use the network status monitor (NSM) to register interest in certain machines. The NSM then notifies the clients/applications on any changed state with respect to monitored machines, such as going offline or online.

For instance, when an NFS client goes down, the lock managers on all servers are notified through their network status monitors (NSM). The server locking managers then release the client's locks, on the assumption that the client will request locks again as needed. When an NFS server crashes, the NFS clients wait for notification from an NSM that the server is back on-line and then take appropriate action to reclaim their locks. Once the server is up, the server lock manager will provide the client lock managers a grace period to submit lock reclaim requests during which the server will accept only reclaim requests.

The above described locking mechanisms are utilized when there is a single NFS server node providing access to a shared storage resource. However, there is a need in the art to provide a locking protocol and mechanism when multiple server nodes provide access to the same shared storage resource.

SUMMARY OF THE DESCRIBED IMPLEMENTATIONS

Provided are a method, system, and program for managing locks enabling access to a shared resource. A first server receives a lock request from a client for the shared resource. A determination is made as to whether a second server owns the client locks. The first server issues a request to the second server to transfer ownership of the client locks to the first server, wherein the client lock requests are handled by the server owning the client locks.

In further implementations, client lock information accessible to both the first and second servers indicates the server owning the locks for the client. The first server issues the request to the first server indicated in the client lock information as owning the locks for the client.

Still further, the first and second servers may maintain client lock state information indicating a state of the server with respect to the client locks, wherein only one server has client lock state information indicating that the server has the client locks.

Described implementations provide techniques for different servers to manage locks for a shared resource in a manner that avoids conflicts between the servers. To avoid conflicts, if a client lock request is routed to a server that does not currently own the client locks, then the receiving server will initiate actions to cause the transfer of ownership of the client locks from the owner server before access to the shared resource is granted.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
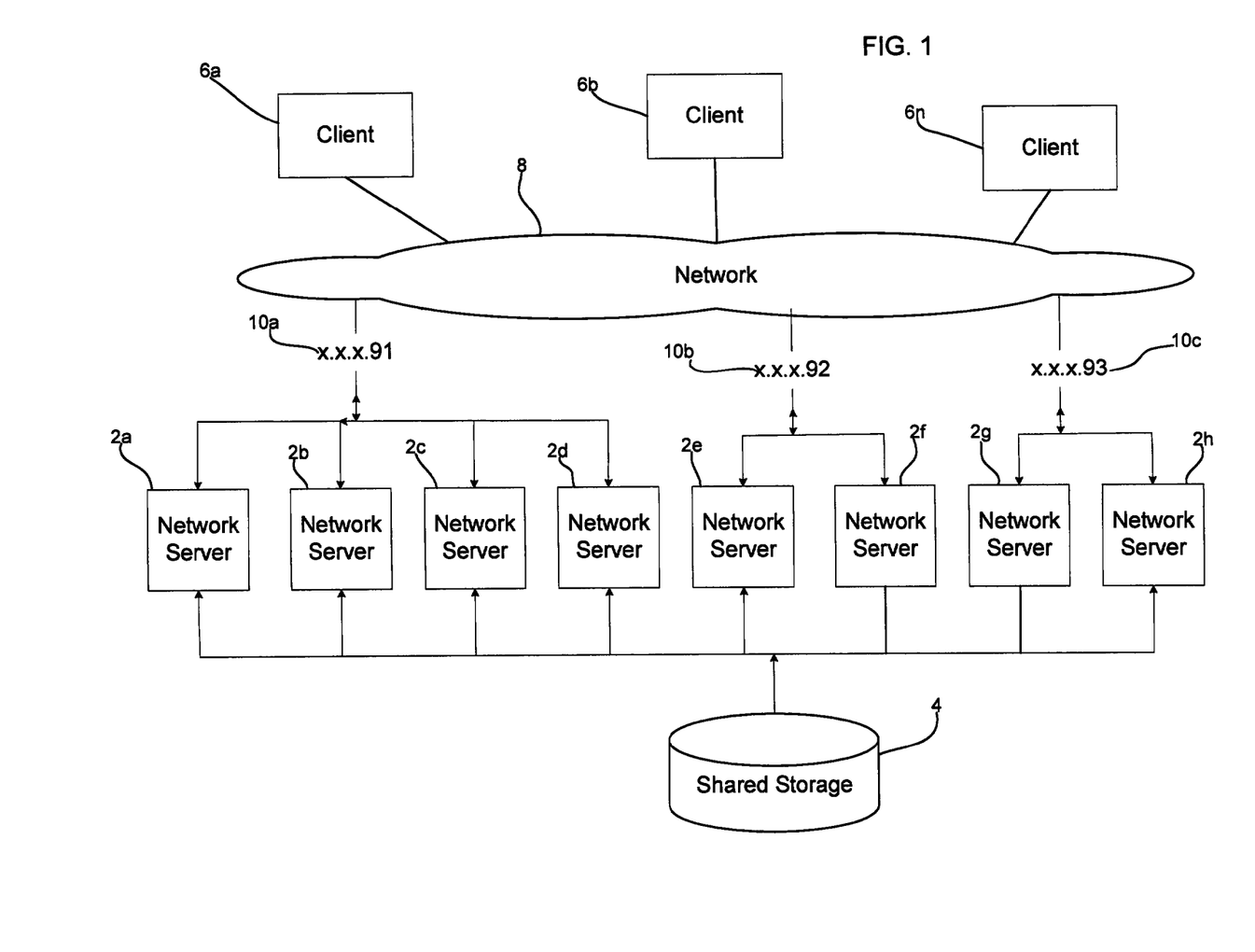
FIG. 1 illustrates a distributed network computing environment in which aspects of the invention are implemented.

FIG. 1 illustrates a network computing environment in which aspects of the invention may be implemented. A plurality of network servers 2a, 2b, 2c . . . 2h provide access to a shared storage resource 4. The network servers 2a, 2b . . . 2h may comprise any type of computing device capable of providing access to a storage resource 4, such as a server class machine. The shared storage 4 may comprise any storage system known in the art which has compatible ports, such as a storage array, e.g., a storage subsystem, a subsystem cluster, Just a Bunch of Disks (JBOD), Redundant Array of Independent Disks (RAID), Direct Access Storage Device (DASD), etc., tape drive, tape library, disk drive, optical disk drive, virtualization device, network storage, etc. A plurality of clients 6a, 6b . . . 6n may access the shared storage 4 through any one of the network servers 2a, 2b . . . 2h over a network 8, such as such as a Local Area Network (LAN), Wide Area Network (WAN), Storage Area Network (SAN), or any other network known in the art, etc. The clients 6a, 6b . . . 6n may comprise any computing device known in the art, such as a personal computer, laptop computer, workstation, mainframe, telephony device, handheld computer, server, network appliance, etc. In certain implementations, the clients and servers may be implemented in separate machines. Alternatively, multiple clients and/or servers may be implemented as separate processes executing in the same computing machine.

In certain implementations, groups of one or more network servers 2a, 2b . . . 2h may be addressed through a common address portion, referred to herein as a virtual interface address. FIG. 1 shows three virtual interface addresses 10a, 10b . . . 10n. The clients 6a, 6b . . . 6n may submit a request to anyone of the virtual interface addresses 10a, 10b, 10c to access the shared storage 4. The client request to one virtual interface address 10a, 10b, 10c would be routed to one of the network servers 2a, 2b . . . 2h capable of being addressed by the selected virtual interface address 10a, 10b, 10c. Each virtual interface address 10a, 10b, 10c addresses a cluster of network servers 2a, 2b . . . 2h. For instance, the virtual address "x.x.x.91" addresses a cluster having network servers 2a, 2b, 2c, 2d. A node address is used to access a particular network server 2a, 2b . . . 2h, and is of the form x.x.x.1, x.x.x.2, etc. When a client requests one of the virtual interface addresses 10a, 10b, 10c, the request would be routed to one of the network servers 2a, 2b . . . 2h addressed by the virtual interface address 10a, 10b, 10c used by the client 6a, 6b . . . 6n. The virtual interface addresses and network server addresses may be entirely different, and may even be on different IP subnets.

With the described implementations, multiple paths and availability are provided at both server levels because the client may select from one or many virtual interface addresses 10a, 10b, 10c and at the virtual interface address, one virtual interface address may be used to access one of multiple network servers 2a, 2b . . . 2h. Although FIG. 1 illustrates a particular number of servers, clients, virtual interface addresses, assignment of servers to virtual interface addresses, etc., the described implementations may be utilized with networks having any number of clients, servers, shared storages, virtual interface addresses and groupings of servers with virtual interface addresses.

Figure 2:
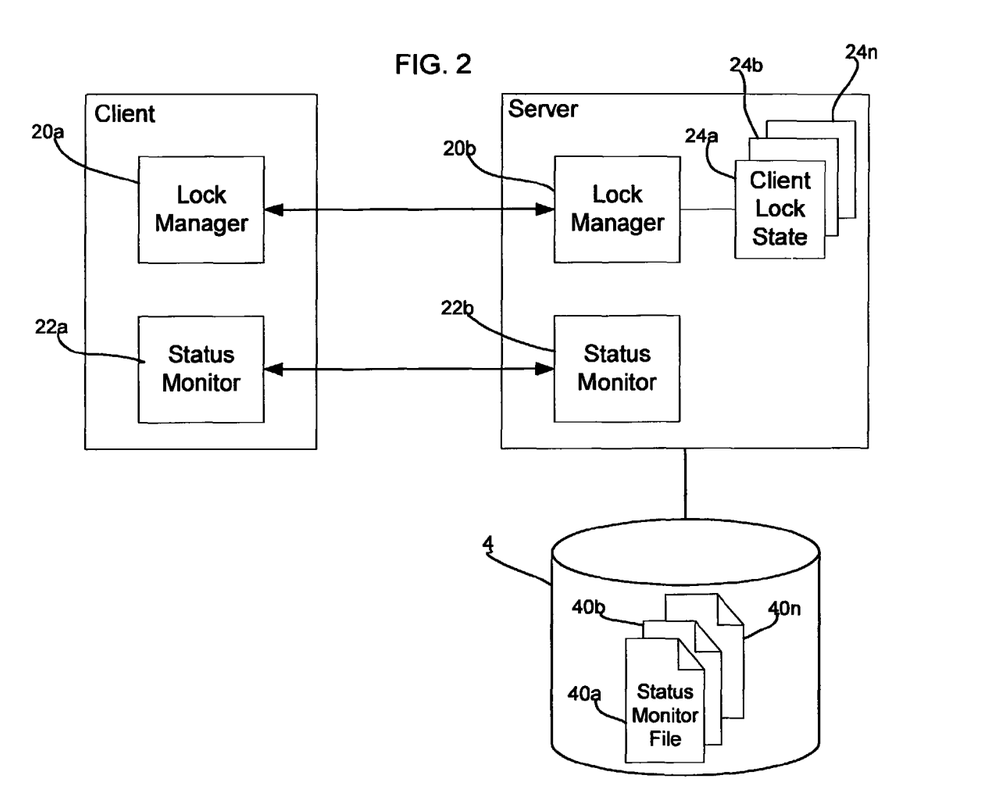
FIG. 2 illustrates the program components in the client and server components in the network computing environment in accordance with implementations of the invention.

FIG. 2 illustrates programs maintained in the clients 6a, 6b . . . 6n and servers 2a, 2b . . . 2h to implement file locking. Each client 6a, 6 . . . 6n may include a lock manager 20a and a network status monitor 22a programs. Each server 2a, 2b . . . 2h may include a lock manager 20b and a status monitor 22b. The client lock manager 20a generates lock requests to the server lock manager 20b in a network server 2a, 2b . . . 2h to perform a locking operation, that is managed by the server lock manager 20b. The client status monitor 22a and server status monitor 22b are capable of communicating messages concerning lock and system status. The client lock manager 20a would receive lock requests from applications and then communicate the lock request to the sever lock manager 20b. In certain implementations, the client lock manager 20a may not reply to application lock requests until the server lock manager 20b responds to the request. Further, when the client lock manager 20a initially communicates a lock request to a server 2a, 2b . . . 2h, the client status monitor 22b would register with the server status monitor 22b to obtain notification of changes in server status. If the server 2a, 2b . . . 2h fails, then the server status monitor 22b notifies all registered client status monitors 22a of the failure and recovery, and the client lock manager 20a will attempt to reacquire the locks from the server lock manager 20b during a reclaim period. Each server lock manager 20b further maintains a client lock state 24a, 24b . . . 24n for each client 6a, 6b . . . 6n, which indicates the state of the server with respect to the locks for that client.

The client and server lock managers 20a, 20b further control access to the shared storage 4 to prevent multiple clients 6a, 6b . . . 6n from issuing conflicting requests to the shared storage 4. For instance, in certain implementations, the lock managers 20a, 20b may implement aspects of the Network File Storage (NFS) locking protocol to manage requests from multiple clients. Alternative network file system locking mechanisms may be used to manage locks for requests from different clients. In certain implementations another server would take over for the failed server and notify the client such that the client will reacquire the locks from one of the surviving servers.

Figure 3:
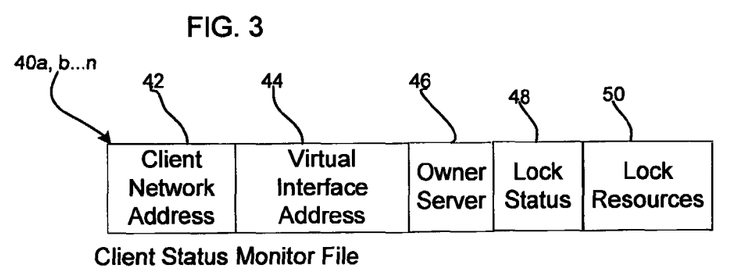
FIG. 3 illustrates client lock information providing information on a server owning the client locks in accordance with implementations of th invention.

In the described implementations, the shared storage 4 maintains information on the locking state for each client in a status monitor file 40a, 40b . . . 40n. As discussed, each server 2a, 2b . . . 2n maintains information on its relation to each client lock in the client lock state 24a, 24b . . . 24n. In certain implementations, the client lock information is maintained in files 40a, 40b . . . 40n (as shown in FIG. 2), where there is one client lock state file for each client 6a, 6b . . . 6n. FIG. 3 illustrates information maintained in each client status monitor file 40, including:

- client network address 42: provides the network address of the client 6a, 6b . . . 6n for which the lock is maintained;
- virtual interface address 44: the virtual interface address (e.g., x.x.x.91, x.x.x.92, etc.) that the client, identified in field 42, uses to access the resource. As discussed, each virtual interface address may be associated with one or more servers 2a, 2b . . . 2n and comprise the common address portion of multiple server addresses.
- owner 46: the address of the network server 2a, 2b . . . 2n owning the lock state. This address would comprise the network server address, e.g., x.x.x.1, x.x.x.2, etc. Alternatively, this could be a node number or other form of identification of a member of a server cluster.
- lock status 48: indicates the status of any ownership transfer operations.
- lock resources 50: identifies currently held client locks, e.g., shared, exclusive, the client holds for different resources in the shared storage 4.

In certain implementation, the lock information such as the client address 42, virtual interface address 44, owner 46, and status 48 may be maintained as attribute information of the file 40a, 40b . . . 40n and the lock resources 50 may be maintained as data in the file. In certain implementations, the lock resources 50 may be present in a file during transfer of ownership of lock state. Although the client lock status information is described as being maintained in a separate file 40a, 40b . . . 40n for each client, in alternative implementations, the lock status information for multiple or all clients may be maintained in the same file or data structure, or maintained in alternative structured format, such as a database, Extensible Markup Language (XML) file, table, etc.

With the described implementations, any network server 2a, 2b . . . 2h can determine the locks held by any client 6a, 6b . . . 6n from the client lock state 24a, 24b . . . 24n maintained in that server 2a, 2b . . . 2n for the client and the status monitor file 40a, 40b . . . 40n for the client (FIG. 3). Further, in certain implementations, client 2a, 2b . . . 2n lock requests can only be handled by the network server 2a, 2b . . . 2n designated as the owner of the client lock state. This ensures that client lock requests are handled by a single server 2a, 2b . . . 2n so that the owner server can manage locks from one client to prevent conflicting lock requests from the client with respect to the shared storage 4. In certain implementations, different storage resources and components of the shared storage 4 may be governed by different locks, thereby allowing the clients 6a, 6b . . . 6n to obtain different locks (exclusive and shared) for the independently accessible resources in the shared storage 4.

To ensure that only one network server 2a, 2b . . . 2n owns the client lock state for a particular client 6a, 6b . . . 6n, in described implementations, the ownership of the client lock state, which is indicated in the owner field 46, may be transferred from one server that previously handled client lock requests to another server receiving the most recent client lock request. Client lock requests may be transmitted to a different server 2a, 2b . . . 2h for load balancing reasons. Further, in the event of a failure at the network server owning the node, the ownership may be transferred to an available node and the client whose lock is maintained at the failing node would be notified of the failure in order to reclaim the locks at the new available server to which ownership is transferred. In certain implementations, ownership is transferred in a manner to avoid processing a conflicting client lock request during the transfer process.

Figure 4:
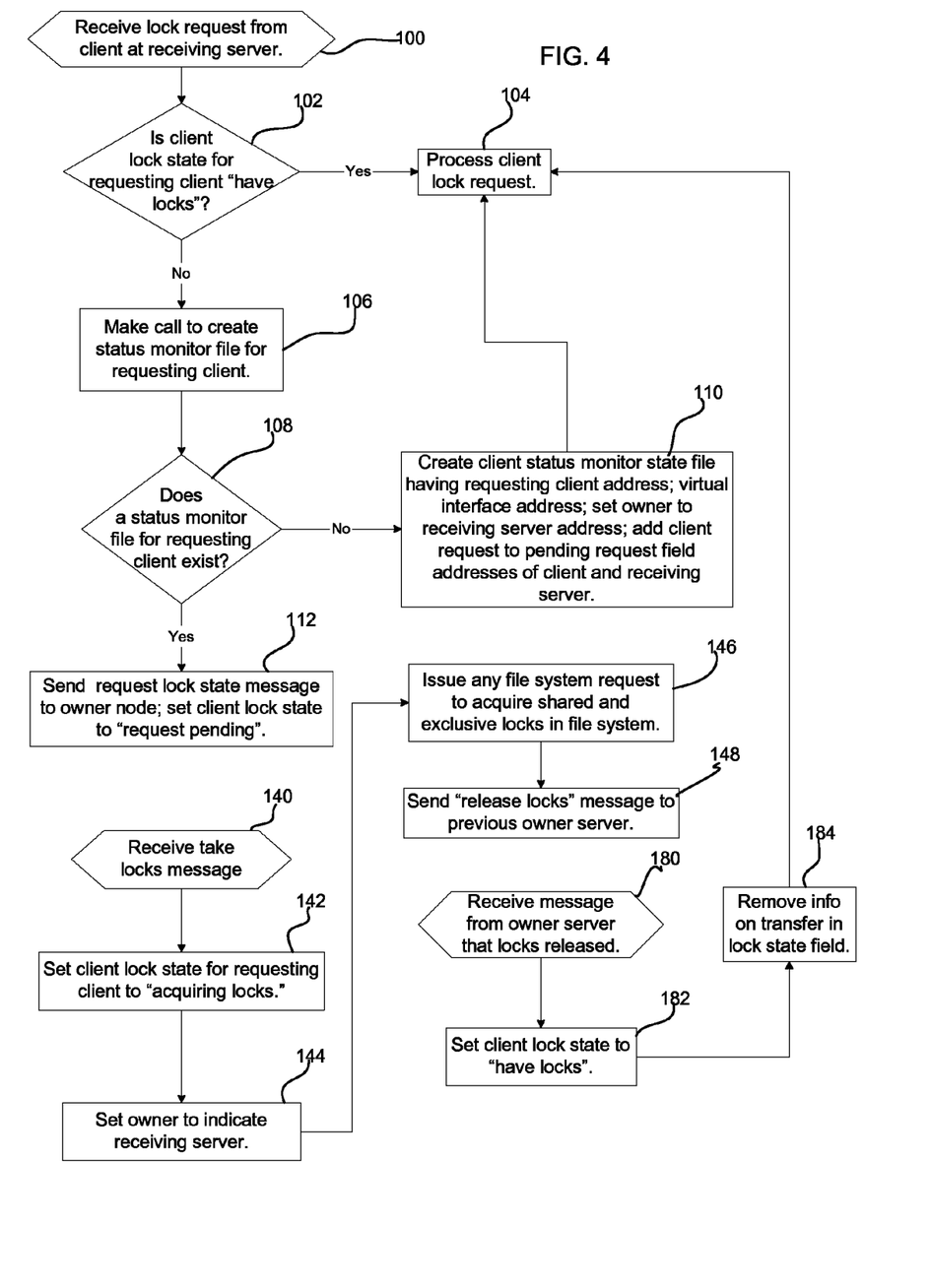
FIGS. 4 and 5 illustrate logic implemented in the client and servers to transfer client lock ownership from one server to another.
Figure 5:
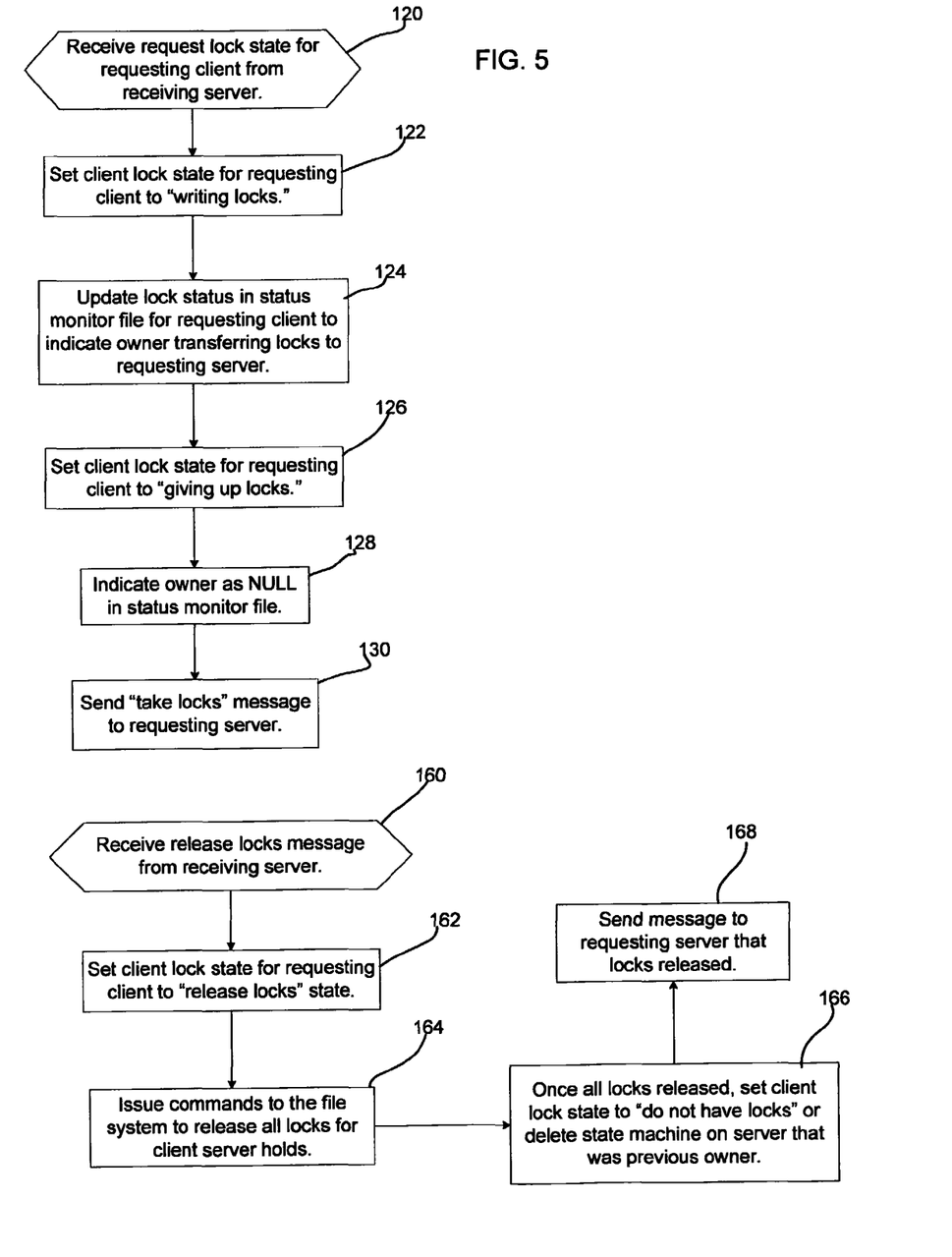

FIGS. 4 and 5 illustrate logic implemented in the client and server lock managers 20a and 20b, respectively, to enable the transfer of ownership of the locks for one client from one server to another. With respect to FIG. 4, control begins at block 100 where the server lock manager 20b receives a lock request from a client lock manager 20a in one of the clients 6a, 6b . . . 6n. The lock request may be to add, delete or modify an exclusive or shared lock. The server lock manager 20b at the server 2a, 2b . . . 2n receiving the request determines (at block 102) if the client lock state 24a, 24b . . . 24n for the requesting client is "have locks", indicating that the receiving server is the owner of the locks for the requesting client. If so, then the server lock manager 20b processes (at block 104) the client lock request. Otherwise, if (at block 102) the client lock state 24a, 24b . . . 24n is "do not have locks", then the server lock manager 20b makes a call (at block 106) to create a status monitor file 40a, 40b . . . 40n for the requesting client. During this call, a determination is made (at block 108) as to whether a status monitor file 40a, 40b . . . 40n for the requesting client exists in the shared storage 4. If not, then a client status monitor file 40a, 40b . . . 40n is created (at block 110) and field 42 is set to the requesting client address; field 44 is set to the virtual interface address portion of the server address the client uses to communicate with the servers 2a, 2b . . . 2h (e.g., x.x.x.91, x.x.x.92, etc); field 46 is set to the receiving server address (e.g., x.x.x.1, x.x.x.2, etc); and the client request is added to the pending request field 48. Control then proceeds to block 104 where the receiving server lock manager 20b processes the client lock request.

If (at block 108) a status monitor file 40a, 40b . . . 40n already exists for the requesting client, then another server owns the client locks. In such case, the receiving server lock manager 40b sends (at block 12) a request lock state message to the owner server 2a, 2b . . . 2h indicated in field 46 of the client status monitor file 40a, 40b . . . 40n and sets the client lock state 24a, 24b . . . 24n at the receiving server 2a, 2b . . . 2h to "request pending".

With respect to FIG. 5, the owner server 2a, 2b . . . 2h, in response to receiving (at block 120) the request lock state message from the receiving server, sets (at block 122) the client lock state 24a, 24b . . . 24n at the owner server to "writing locks", indicating that the owner server is starting the process of transferring the client locks to another server 2a, 2b . . . 2h. The owner server lock manager 20b then updates (at block 124) the lock status field 48 (FIG. 3) in the client lock state file 24a, 24b . . . 24n for the requesting client to indicate the owner server is transferring locks to the requesting server. In certain implementations, the owner server writes the lock state 24a, 24b . . . 24n to the disk before notifying the requesting server to retrieve the locks. The owner server then sets (at block 126) the client lock state 24a, 24b . . . 24n for the requesting client to "giving up locks" and sets (at block 128) the owner field 46 in the status monitor file 40a, 40b . . . 40n to "NULL", to indicate that the owner is in the process of being changed. The owner server 2a, 2b . . . 2n then sends (at block 130) a "take locks" message to the receiving server 2a, 2b . . . 2n so that the receiving server proceeds with the lock state transfer.

With respect to FIG. 4, the receiving server 2a, 2b . . . 2n, in response to receiving (at block 140) the "take locks" message from the owner server 2a, 2b . . . 2n, sets (at block 142) the client lock state 24a, 24b . . . 24n for the requesting client to "acquiring locks" to indicate that the receiving server is in the process of acquiring ownership of the locks for the requesting client. The receiving server 2a, 2b . . . 2n then sets (at block 144) the owner server field 46 in the client status monitor file 40a, 40b . . . 40n to the address of the receiving server. The receiving server 2a, 2b . . . 2n may further issue (at block 146) commands to the file system to acquire the locks indicated in the lock resources 50 of the status monitor file 40a, 40b . . . 40n. The file system would grant shared locks because such shared locks can be held by both the requesting server and previous owner server. In certain implementations, the file system may allow both the requesting server and previous server owner to have exclusive locks while the ownership is being transferred to ensure that no intervening server could obtain an exclusive lock while the transfer of ownership is occurring. In such implementations, the file system would allow two servers, the receiving and current owner, to simultaneously have exclusive locks to a shared storage 4 resource under the assumption that a server lock manager 20b would only request an exclusive lock when the lock manager is transferring ownership from the owner server to itself. In such situations, the receiving server requesting the transfer of ownership will not use the exclusive lock to issue conflicting access requests to the shared storage resource because simultaneous exclusive locks are only held during the ownership transfer phase.

Thus, in certain implementations, the file system provides a technique for moving locks from one network server to another without having the exclusive locks released in a manner that would allow a different network server to obtain the lock. In the above described implementations, a lock manager in a first network server attempting to obtain the lock may use a restricted interface to obtain an exclusive lock while the same lock is already granted to a second network server. Later, the second network server would release the lock after the lock is moved to the first network server.

After acquiring all shared and/or exclusive locks indicated in the lock resources 50 of the status monitor file 40a, 40b . . . 40n, the receiving server 2a, 2b . . . 2h sends (at block 148) a "release locks" message to the previous owner server 2a, 2b . . . 2h.

With respect to FIG. 5, the previous owner server 2a, 2b . . . 2h upon receiving (at block 160) the "release locks" message, sets (at block 162) the client lock state 24a, 24b . . . 2n for the requesting client to the "release locks" state. The previous owner server lock manager 20b then issues (at block 164) commands to the file system to release all locks for the client that the owner server holds, where such locks are indicated client lock state 24a, 24b . . . 24n for the requesting client 6a, 6b . . . 6n. After the file system acknowledges that all locks are released, the previous owner server lock manager 20b sets (at block 166) the client lock state 24a, 24b . . . 24n to "do not have locks". Alternatively, the server may delete the client lock state 24a, 24b . . . 24n, indicating that the previous owner server does not have the locks for that client, to conserve server memory resources. The previous owner server lock manager 20b may then send (at block 168) a message to the requesting server that all locks were released.

With respect to FIG. 4, upon receiving (at block 180) the message from the previous owner server that all locks were released, the requesting server lock manager 20b sets (at block 182) the client lock state 24a, 24b . . . 24n to "have locks" and removes (at block 184) information on the transfer operation from the lock status field 48 of the client status monitor file 40a, 40b . . . 40n. Control then proceeds to block 104 to process the pending client lock request, indicated in the pending request field 48.

With the described implementations, only one of the servers at a time will handle lock requests for a particular client to the shared storage 4 resource. This allows the server holding the client locks to prevent a single client from issuing conflicting lock requests. As discussed, conflicting lock requests among different clients are handled at a different level in the distributed file system. With the described implementations, if a client lock request is routed to a server that does not currently own the client locks, i.e., its client lock state 24a, 24b . . . 24n is not "have locks", then the receiving server will initiate actions to cause the transfer of ownership of the client locks from the owner server. As discussed, a client lock request may be routed to a different network server 2a, 2b . . . 2h due to load balancing.

Further, because during the lock ownership transfer, a client status monitor file exists identifying an owner, no other server would attempt to obtain an exclusive lock for the client. Moreover, if another intervening server tried to cause the transfer of the ownership of the client locks while a transfer of such client locks was already occurring between two servers, then that intervening server would not get the "take locks" message to allow it to continue (at block 140 in FIG. 4) to the "acquiring locks" state. In such case, the intervening server would have to wait until the ownership transfer is complete before causing the new owner to transfer ownership to the intervening server.

The client status monitor files may also be used to facilitate lock reclamation. For instance, if a server fails, then another server alerted through the server status monitor 22b of such failure may search the status monitor files 40a, 40b . . . 40n in the shared storage to locate all clients whose client status monitor files indicate the failed server as the owner server 46 (FIG. 3). The server locating the status monitor files may then notify the clients of the server failure so those clients may reclaim their locks on any server still available.

Additional Implementation Details

The described techniques for managing locks in a distributed computing system may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In described implementations, the locking was managed in a distributed manner through the lock managers maintained in the clients and servers. Alternatively, certain lock management operations may be handled by a central server.

In the described implementations, the locks were used to manage access to shared storage resources. In alternative implementations, the locks may be used to manage access to any computing or other resource accessible to the servers providing the clients access to the resources.

In described implementations, the client status monitor files are maintained in a directory location in the shared storage 4 known to all the servers. In alternative implementations, the client status monitor files may be maintained in a location other than the shared storage 4.

The illustrated logic of FIGS. 4 and 5 shows certain events occurring in a certain order. In alternative implementations, certain operations may be performed in a different order, modified or removed. Morever, steps may be added to the above described logic and still conform to the described implementations. Further, operations described herein may occur sequentially or certain operations may be processed in parallel. Yet further, operations may be performed by a single processing unit or by distributed processing units.

Certain alphabetic variables, such as a, b, c, h, n, etc., are used to denote an integer value indicating a number of a certain element. These variables may indicate any value in the different instances in which they are used, and are used to indicate that the element with which they are used may have any number of instances.

Figure 6:
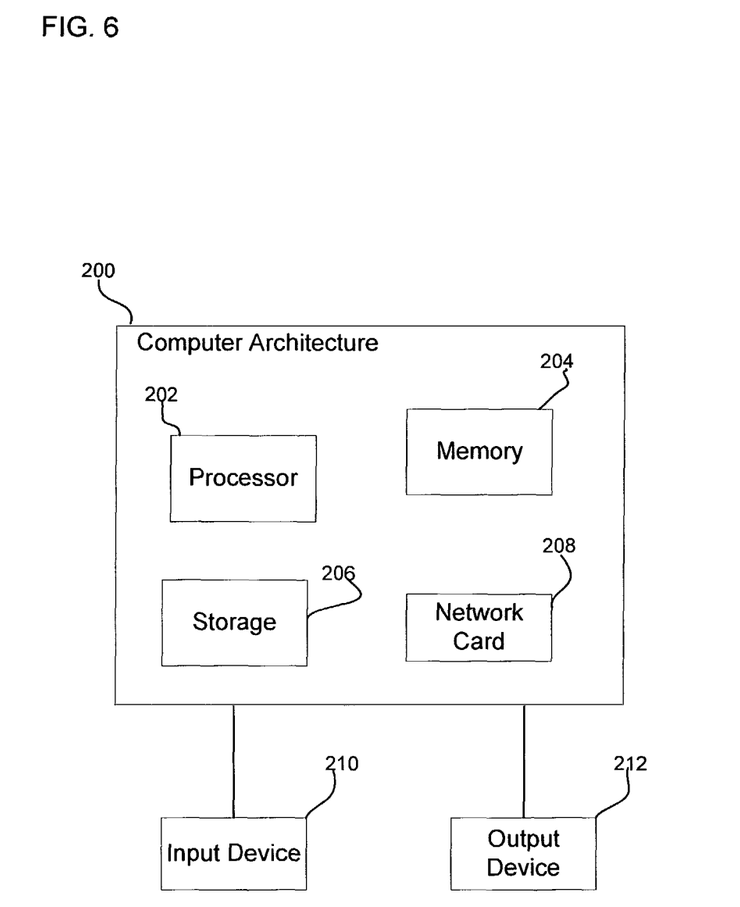
FIG. 6 illustrates an architecture of computing components in the network environment, such as the clients and servers, and any other computing devices.

FIG. 6 illustrates one implementation of a computer architecture 200 of the network components, such as the clients and servers, shown in FIGS. 1 and 2. The architecture 200 may include a processor 202 (e.g., a microprocessor), a memory 204 (e.g., a volatile memory device), and storage 206 (e.g., a non-volatile storage, such as magnetic disk drives, optical disk drives, a tape drive, etc.). The storage 206 may comprise an internal storage device or an attached or network accessible storage. Programs in the storage 206 are loaded into the memory 204 and executed by the processor 202 in a manner known in the art. The architecture further includes a network card 208 to enable communication with a network. An input device 210 is used to provide user input to the processor 202, and may include a keyboard, mouse, pen-stylus, microphone, touch sensitive display screen, or any other activation or input mechanism known in the art. An output device 212 is capable of rendering information transmitted from the processor 202, or other component, such as a display monitor, printer, storage, etc.

The foregoing description of various implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An article of manufacture for managing locks enabling access to a shared resource in a network environment including a first server and second server, wherein the article of manufacture causes operations to be performed at the first server, comprising:
    receiving a lock request from a client for the shared resource;
    determining whether the second server owns client locks in response to receiving the lock request; and
    issuing a request to the second server to transfer ownership of the client locks to the first server in response to determining that the second server owns the client locks, wherein client lock requests are handled by the first or second server owning the client locks.

2. The article of manufacture of claim 1, wherein the article of manufacture further causes the first server to perform:
    if the first server owns the client locks for the client, then processing the client lock request.

3. The article of manufacture of claim 1, wherein the article of manufacture further causes the first server to perform:
    providing client lock information accessible to both the first and second servers indicating the server owning the client locks for the client, wherein the second server is indicated in the client lock information as owning the client locks for the client.

4. The article of manufacture of claim 1, wherein the article of manufacture further causes the first server to perform:
    maintaining client lock state information indicating a state of the server with respect to the client locks, wherein each server has client lock state information.

5. The article of manufacture of claim 4, wherein there are a plurality of clients capable of sending lock requests to the servers to access the shared resource, and wherein the first server maintains client lock state information for each client.

6. The article of manufacture of claim 4, wherein the server client lock state information indicates whether the first server or another server owns the client locks for the client.

7. The article of manufacture of claim 4, wherein the second server sets the client lock state information to indicate that the second server is giving up the client locks after receiving the request from the first server for the client locks.

8. The article of manufacture of claim 7, wherein the article of manufacture further causes the first server to perform:
    receiving a message from the second server to take the client locks after setting the client lock state information to indicate that the second server is transferring the client locks.

9. The article of manufacture of claim 1, wherein the article of manufacture further causes the first server to perform:
    issuing a request for the client locks, including exclusive client locks, before the second server has released exclusive client locks, wherein both the first server and second server simultaneously have exclusive client locks during the transfer of ownership of the client locks from the second server to the first server.

10. The article of manufacture of claim 9, wherein the article of manufacture further causes the first server to perform:
    sending a message to the second server after obtaining the client locks, including any exclusive locks, to release the client locks, wherein the second server releases the client locks in response to receiving the message from the first server to release the client locks.

11. The method of claim 10, wherein the article of manufacture further causes the first server to perform:
    maintaining client lock state information indicating a state of the server with respect to the client locks, wherein each server has client lock state information, wherein the second server sends a message that the client locks have been released after the client locks owned by the second server have been released; and
    setting the client lock state information to indicate that the first server has the client locks after receiving the message from the second server that the client locks have been released.

12. The article of manufacture of claim 1, wherein the article of manufacture further causes the first server to perform:
    receiving the lock request after a load balancing operation directs client lock requests for the shared resource from the second server to the first server.

13. The method of claim 1, wherein the shared resource comprises a common storage space.

14. A server for managing locks enabling access to a shared resource in a network environment including a plurality of remote servers and clients, comprising:
    a port adapted to receive communication from the remote servers and at least one client;
    code implemented in the server to cause the server to perform:
        receiving a lock request from a client for the shared resource through the port;
        determining whether one remote server owns client locks in response to receiving the lock request; and
        issuing a request to the remote server to transfer ownership of the client locks to the server in response to determining that the remote server owns the client locks, wherein client lock requests are handled by the server or remote server owning the client locks.

15. The system of claim 14, wherein the code further causes the server to perform:
    if the first server owns the client locks for the client, then processing the client lock request.

16. The system of claim 14, wherein the code further causes the server to perform:
    providing client lock information accessible to both the first and second servers indicating the server owning the client locks for the client, wherein the second server is indicated in the client lock information as owning the client locks for the client.

17. The system of claim 14, wherein the code further causes the server to perform:
    maintaining client lock state information indicating a state of the server with respect to the client locks, wherein each server has client lock state information indicating that the server has the client locks.

18. The system of claim 14, wherein the remote server sets the client lock state information to indicate that the remote server is giving up the client locks after receiving the request from the server for the client locks.

19. The system of claim 18, wherein the code further causes the server to perform:
receiving a message from the remote server to take the client locks after setting the client lock state information to indicate that the remote server is transferring the client locks.

20. The system of claim 14, wherein the code further causes the server to perform:
issuing a request for the client locks, including exclusive client locks, before the remote server has released exclusive client locks, wherein both the server and remote server simultaneously have exclusive client locks during the transfer of ownership of the client locks from the remote server to the server.

21. The system of claim 20, wherein the code further causes the server to perform:
sending a message to the remote server after obtaining the client locks, including any exclusive locks, to release the client locks, wherein the remote server releases the client locks in response to receiving the message from the server to release the client locks.

22. The system of claim 21, wherein the code further causes the server to perform:
maintaining client lock state information indicating a state of the server with respect to the client locks, wherein each server has client lock state information, wherein the remote server sends a message that the client locks have been released after the client locks owned by the remote server have been released; and
setting the client lock state information to indicate that the server has the client locks after receiving the message from the remote server that the client locks have been released.

23. A server for managing locks enabling access to a shared resource in a network environment including a plurality of remote servers and clients, comprising:
means for receiving communication from the remote servers and at least one client;
means for receiving a lock request from a client for the shared resource through the port;
means for determining whether one remote server owns client locks in response to receiving the lock request; and
means for issuing a request to the remote server to transfer ownership of the client locks to the server in response to determining that the remote server owns the client locks, wherein client lock requests are handled by the server or the remote server owning the client locks.

24. A method for managing locks enabling access to a shared resource, comprising:
receiving, at a first server, a lock request from a client for the shared resource;
determining whether a second server owns client locks in response to receiving the lock request; and
issuing, with the first server, a request to the second server to transfer ownership of the client locks to the first server in response to determining that the second server owns the client locks, wherein client lock requests are handled by the first or second server owning the client locks.

25. The method of claim 24, further comprising:
if the first server owns the client locks for the client, then processing, with the first server, the client lock request.

26. The method of claim 24, further comprising:
providing client lock information accessible to both the first and second servers indicating the server owning the client locks for the client, wherein the first server issues the request to the first server indicated in the client lock information as owning the client locks for the client.

27. The method of claim 26, wherein the first and second servers have network addresses including a shared virtual interface address portion, and wherein the client lock information indicates the shared virtual interface address portion of the server owning the client locks for the client.

28. The method of claim 24, further comprising:
maintaining, by the first and second servers, client lock state information indicating a state of the server with respect to the client locks, wherein each server has client lock state information indicating that the server has the client locks.

29. The method of claim 28, wherein there are a plurality of clients capable of sending lock requests to the servers to access the shared resource, and wherein the servers maintain client lock state information for each client capable of sending lock requests.

30. The method of claim 28, wherein the first server client lock state information indicates whether the first server or another server owns the client locks for the client.

31. The method of claim 24, further comprising:
setting, by the second server, the client lock state information to indicate that the second server is giving up the client locks after receiving the request from the first server for the client locks.

32. The method of claim 31, further comprising:
sending, by the second server, a message to the first server to take the client locks after setting the client lock state information to indicate that the second server is transferring the client locks.

33. The method of claim 24, further comprising:
issuing, by the first server, a request for the client locks, including exclusive client locks, before the second server has released exclusive client locks, wherein both the first server and second server simultaneously have exclusive client locks during the transfer of ownership of the client locks from the second server to the first server.

34. The method of claim 33, further comprising:
sending, by the first server, a message to the second server after obtaining the client locks, including any exclusive locks, to release the client locks; and
releasing, by the second server, the client locks in response to receiving the message from the first server to release the client locks.

35. The method of claim 34, further comprising:
maintaining, by the first and second servers, client lock state information indicating a state of the server with respect to the client locks, wherein each server has client lock state information indicating that the server has the client locks;
sending, by the second server, a message that the client locks have been released after the client locks owned by the second server have been released; and
setting, by the first server, the client lock state information to indicate that the first server has the client locks after receiving the message from the second server that the client locks have been released.

* * * * *